United States Patent
Beck et al.

(10) Patent No.: US 9,617,410 B2
(45) Date of Patent: Apr. 11, 2017

(54) POLYCARBOXYLATE ETHERS USED AS DISPERSING AGENTS FOR EPOXY RESINS

(71) Applicant: SIKA TECHNOLOGY AG, Baar (CH)

(72) Inventors: Edda Beck, Gomaringen (DE); Patrick Schnabel, Bad Urach (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/441,535

(22) PCT Filed: Oct. 28, 2013

(86) PCT No.: PCT/EP2013/072505
§ 371 (c)(1),
(2) Date: May 8, 2015

(87) PCT Pub. No.: WO2014/072200
PCT Pub. Date: May 15, 2014

(65) Prior Publication Data
US 2015/0284563 A1 Oct. 8, 2015

(30) Foreign Application Priority Data
Nov. 9, 2012 (EP) .................................... 12192048

(51) Int. Cl.
*C08L 63/00* (2006.01)
*C08G 59/50* (2006.01)
*C08K 3/26* (2006.01)
*C08G 59/22* (2006.01)
*C08K 3/00* (2006.01)
*C08K 3/22* (2006.01)

(52) U.S. Cl.
CPC .............. *C08L 63/00* (2013.01); *C08G 59/22* (2013.01); *C08G 59/502* (2013.01); *C08G 59/5026* (2013.01); *C08K 3/0033* (2013.01); *C08K 3/26* (2013.01); *C08K 2003/2241* (2013.01); *C08K 2003/2268* (2013.01); *C08K 2003/265* (2013.01); *C08L 2205/06* (2013.01)

(58) Field of Classification Search
CPC ..................................................... C08L 63/00
See application file for complete search history.

(56) References Cited

U.S. PATENT DOCUMENTS

| 6,376,417 | B1 * | 4/2002 | Yang | .................... | B01J 31/0201 |
| | | | | | 502/121 |
| 2009/0223416 | A1 * | 9/2009 | Aberle | ................ | C04B 24/2623 |
| | | | | | 106/822 |
| 2010/0069552 | A1 | 3/2010 | Guerret et al. | | |
| 2010/0081736 | A1 * | 4/2010 | Willimann | ................ | C08F 2/24 |
| | | | | | 524/42 |
| 2010/0197840 | A1 * | 8/2010 | Sulser | ................... | C04B 24/165 |
| | | | | | 524/145 |
| 2012/0286190 | A1 * | 11/2012 | Prat | ........................ | C04B 28/06 |
| | | | | | 252/62 |

FOREIGN PATENT DOCUMENTS

| CN | 102382611 A | 3/2012 |
| DE | 43 08 773 A1 | 1/1994 |
| DE | 100 15 135 A1 | 10/2001 |
| DE | 10 2006 005 093 A1 | 8/2007 |
| EP | 0 417 490 A2 | 3/1991 |
| EP | 1 138 697 A1 | 10/2001 |
| EP | 1348729 A1 | 10/2003 |
| EP | 1061089 B1 | 3/2004 |
| EP | 1 723 155 B1 | 11/2009 |
| WO | 95/09821 A2 | 4/1995 |
| WO | 97/35814 A1 | 10/1997 |
| WO | 2005/090416 A1 | 9/2005 |
| WO | 2011/139580 A2 | 11/2011 |

OTHER PUBLICATIONS

Jan. 14, 2014 International Search Report issued in International Patent Application No. PCT/EP2013/072505.
May 12, 2015 International Preliminary Report on Patentability issued in International Patent Application No. PCT/EP2013/072505.

* cited by examiner

*Primary Examiner* — Megan McCulley
(74) *Attorney, Agent, or Firm* — Oliff PLC

(57) ABSTRACT

The invention relates to curable epoxy resin compositions containing at least one epoxy resin having on average more than one epoxide group per molecule, at least one inorganic filler and at least one polycarboxylate ether, wherein the inorganic filler is coated with the polycarboxylate ether. The invention also relates to multi-component systems for producing said epoxy resin compositions, cured epoxy resins, a powder component K3 for the multi-component system, uses and methods.

15 Claims, 1 Drawing Sheet

POLYCARBOXYLATE ETHERS USED AS DISPERSING AGENTS FOR EPOXY RESINS

TECHNICAL FIELD

Figure 1:
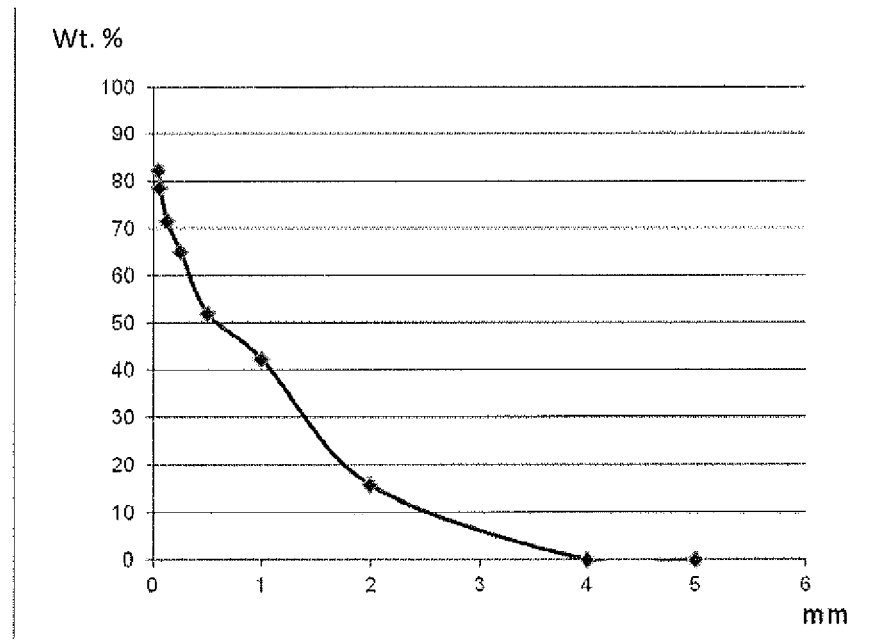

The present invention relates to curable epoxy resin compositions containing at least one epoxy resin having on average more than one epoxide group per molecule, at least one inorganic filler and at least one polycarboxylate ether, wherein the inorganic filler is coated with the polycarboxylate ether.

The present invention also relates to multi-component systems for producing epoxy resin compositions, cured epoxy resins, filler components for the multi-component system, uses and processes.

PRIOR ART

Epoxy resins are used for a variety of applications, for example as adhesives, coatings, sealants or molding compositions for producing moldings. During processing, inorganic fillers are often added to epoxy resins in order to influence the properties of the curable resins or cured plastic materials. Inorganic fillers, for example, improve the strength of epoxy resins or the adhesion of the resins to substrates. Inorganic fillers in epoxy resins also fulfill many other functions such as being flame retardants, insulators, viscosity modifiers or dyes (as pigments). Another purpose is to save expensive epoxy resin, resulting in cost savings.

The fillers are incorporated prior to curing in the still liquid or pasty epoxy resin and distributed as evenly as possible. However, larger amounts of fillers often cannot readily be incorporated homogeneously into the compositions.

The filler uptake capacity of epoxy resins is limited, as the fillers markedly decrease the flowability of the epoxy resin composition and hence the workability. Another problem is the insufficient compatibility of the inorganic fillers with the organic resins, which can lead to inadequate wetting. This may result in formation of agglomerates of fillers and inhomogeneities, which reduce the stability and the flowability of the products.

In the prior art the problem of insufficient compatibility is solved by additives which improve the wettability of the inorganic fillers. For example, wetting agents, which are often low molecular weight surfactants, are added in the prior art. They reduce the surface tension at the interface and thus promote the wetting of the filler surfaces. Typical wetting agents are, for example, long chain fatty acids such as sodium stearate. However, because of the small chain lengths of such surfactants their dispersing action is low. Another disadvantage is that epoxy compositions having surfactants tend to foam.

To solve the problem, coated fillers are also used in the prior art. Here, the surface of the inorganic fillers, for example those made of silica, is modified by silanization with organosilanes. Depending on which silanization agent is used, the surface, for example, is provided with hydroxy or ether groups. Suitable silanization agents are commercially available and are sold for example by Evonik, DE, under the brand name Dynasilan. However, surface coatings by silanization are relatively complex. For time and cost reasons the method is therefore hardly suitable for users who need to customize a filler with as little effort as possible for a special epoxy resin.

A further class of additives to improve the compatibility of inorganic fillers with curable polymer compositions is that of dispersing agents based on hydrophilic polymers. EP 0 417 490 A2 and EP 1 723 155 disclose dispersing agents based on phosphoric acid esters with long-chain polyester components. Such dispersing agents are commercially available, for example, from BYK, DE, under the trade name BYK-W 9010. They do not always have adequate dispersing properties for specific curable polymer compositions and are also relatively expensive.

US 2010/0069552 A1 describes thermoplastic polymer compositions, in particular based on polyvinyl chloride, which contain inorganic fillers and comb polymers. The additives are preferably incorporated in the thermoplastic plastic material as dry powder. Thermoplastic polymers are structurally different from curable polymers and are therefore processed by fundamentally different methods.

DE 10 2006 005 093 A1 discloses liquid aqueous dispersions containing silica and polycarboxylate ether. The dispersions are used as concrete admixtures to improve the workability.

CN102382611A discloses a composition of 30 to 45 parts of epoxy resin, 10 to 15 parts of polycarboxylate ether, 5 to 30 parts of cycloaliphatic amine and 100 to 160 parts of filler. The components are mixed according to the exemplary embodiment and processed to form a paste which is then cured. The high proportion suggests that the polycarboxylate ether serves as a structural component.

WO 2011/139580 A2 relates to compositions containing (meth)acrylic polymers, plastic materials and fillers. The (meth)acrylic polymers with the components (a) to (d) are polycarboxylate ethers. The fillers are preferably inorganic fillers. According to the exemplary embodiments, an unsaturated polyester is used as the plastic material. The polyester resin, the inorganic filler and the PCE are mixed and processed to form a paste (paragraph [0113]). Specific compositions concerning epoxy resins are not described.

Overall, it would be desirable to provide improved methods and additives, which improve in an efficient and simple manner the compatibility of inorganic fillers with curable epoxy resin compositions as well as the processing properties and the flowability of epoxy resin products.

THE OBJECT OF THE INVENTION

The object of the invention is to overcome the problems described above. Means and methods are to be provided to achieve the incorporation of inorganic fillers in epoxy resin compositions in an efficient and simple manner. In doing so, high filler loadings should be made possible.

In particular, the invention shall improve the workability and flowability of the curable and not yet solid filler-containing epoxy compositions. The viscosity of the filler-containing resin compositions shall be decreased, without adversely affecting the properties and stability of the products. Even in the presence of high amounts of filler the epoxy resin compositions shall exhibit good flowability, which preferably shall be maintained over long processing periods.

The fillers shall be readily dispersible in the curable resin compositions, wherein undesirable effects such as segregation, agglomeration and inhomogeneities shall be avoided. The cured products shall have a structure that is as homogeneous as possible.

The invention shall enable the user to individually set the flowability for specific epoxy compositions epoxy in a simple, efficient and cost-effective manner.

DISCLOSURE OF THE INVENTION

The object underlying the invention is achieved by epoxy resin compositions, multi-component systems, cured epoxy resins, uses, processes and powdered components according to the claims.

The invention relates to a curable epoxy resin composition containing at least one epoxy resin having on average more than one epoxide group per molecule, at least one inorganic filler and at least one polycarboxylate ether, wherein the inorganic filler is coated with the polycarboxylate ether.

Epoxy resin compositions include cross-linkable epoxy resins having more than one epoxide group per molecule. These react with suitable curing agents to form covalent bonds. According to the invention, the curable epoxy resin composition may already contain the curing agent or may not contain the curing agent. The epoxy resin composition according to the invention is curable, because the epoxide groups have not yet or have only partially reacted with the curing agent. Therefore, the composition is preferably liquid or pasty. Preferably, it has not yet solidified by partial curing to form a solid.

The inorganic filler is coated with the polycarboxylate ether, i.e., provided with the polycarboxylate ether on the filler surface. Preferably, the coating is not covalently bonded to the surface. According to the invention it was found that a sufficiently stable coating and effectiveness can be achieved even without covalent bonding. Preferably, the filler surface is coated completely, that is, without gaps. However, it may also be only partially coated, for example on average to the extent of more than 20%, more than 50%, or more than 90%.

In a preferred embodiment of the invention, the coated inorganic filler is present in solid form, particularly in the form of a powder. Even after storage for extended periods of time, the coated inorganic fillers can be used according to the invention. Without being bound by theory, it is believed that polycarboxylate ethers are absorbed with the polycarboxylate main chain on the surface of the fillers, while the side chains have polyethers which face away from the filler surfaces and cause a steric stabilization of the filler particles. Such alignment of polycarboxylate ethers on the surface of inorganic particles has been described for cement compositions.

In a preferred embodiment, the inorganic filler was coated by impregnation with a solution or suspension containing or consisting of the polycarboxylate ether and a solvent. The impregnation can be done in any suitable manner. For example, a solid filler mixture can be charged in first, then a solution or suspension of the polycarboxylate ether in the solvent added, for example by spraying in a mixer.

In a preferred embodiment, during impregnation the solvent is adsorbed by the filler on the surface thereof. In this context, the coated filler is an essentially solid filler, which is provided on the surface with the polycarboxylate ether, and also contains the solvent. The solvent on the particle surface can then act as a mediator between the epoxy resin matrix and the polycarboxylate ether. Without being bound by theory, it is believed that the polycarboxylate ether dissolved in the solvent on the one hand improves the compatibility between the filler surface and epoxy resin matrix, and on the other hand, the flowability of the filled epoxy resin mixture is improved by electrostatic repulsion and steric stabilization of the filler particles. This embodiment also has the advantage that no drying steps or other steps for removal of the solvent are required, and that only a small amount of solvent is required in total.

The solvent may also diffuse at least partially into the interior of the filler. In a further embodiment, after impregnation of the filler the solvent can be removed partially or completely, for example by drying.

In general, the solvent is selected so that the polycarboxylate ether dissolves well in the solvent. At the same time, the solvent should be compatible with the epoxy resin, i.e. not undesirably interact with it. Preferably, the solvent in the composition is inert, that is, not reactive. The solvent is preferably an organic solvent. In general, water is not or is only marginally suitable, since it can affect the epoxy resin reaction in an undesirable manner as other protic solvents do. If water or another non-compatible solvent is used to impregnate the filler, it should be removed prior to the introduction of the fillers in the epoxy resin, for example by drying. Small amounts of water or other solvents which do not or only slightly affect the epoxy resin composition, however, are acceptable.

The solvent is preferably polar. Polar solvents are better suited to dissolve polycarboxylate ethers. The solvent is preferably liquid at room temperature (23° C.).

The solvent is preferably amphiphilic. It was found that amphiphilic solvents having a polar and a hydrophobic molecular component can support the mixing of the coated fillers with an epoxy resin composition to a particular extent.

Preferably, the solvent is an ester, ether or alcohol. The solvent may be, in particular, an alkyl alcohol, alkyl acid alkyl ester or dialkyl alcohol, wherein the alkyl radicals in each case may be branched or straight and can have, for example, 1 to 10, in particular 2 to 6 carbon atoms. The alcohol may be a di- or polyalcohol and the ether may be a polyether such as polyethylene glycol, e.g., triethylene glycol. The solvent may also be a phenol such as nonylphenol. Particularly preferably, the solvent is benzyl alcohol, propylene carbonate, phenoxyethanol or glycol ether. Mixtures of the above solvents may be used as well.

In a preferred embodiment the solvent is a high boiler. Preferably, the boiling point is above 150° C., more preferably above 200° C. This makes coated fillers that have been impregnated with the solvent relatively stable in storage and use. In particular, it is believed that the solvent remains adsorbed at the surface of the fillers and does not volatilize or diffuse away in an undesirable manner.

In a preferred embodiment, the epoxy resin composition is anhydrous. This means that it contains no water or possibly contains small amounts of water. The water content can be, for example, less than 0.5 wt. %, less than 0.1 wt. % or less than 0.05.% wt. %, based on the total weight of the composition. In a further embodiment of the invention, the epoxy resin composition contains an organic solvent which is liquid at room temperature (23° C.). The solvent may serve, for example, to adjust the viscosity or to promote or ensure the mixing of the components. The proportion of the organic solvent is preferably less than 10 wt. % or less than 2 wt. %, based on the total weight of the composition. The proportion may be, for example, 0.01 to 50 wt. %, 0.1 to 20 wt. % or 0.2 to 2 wt. %, based on the total weight of the composition.

In a preferred embodiment of the invention, the epoxy resin composition contains at least one curing agent. The epoxy resin composition may already be in the process of curing. Alternatively, the reaction does not yet begin even in the presence of the curing agent because the composition was not yet sufficiently activated. Such compositions typically contain a latent curing agent. The activation of epoxy resin composition having latent curing agents can be done by addition of catalysts or by increasing the temperature, for example to temperatures above 80° C. or above 150° C.

The epoxy resin composition according to the invention contains at least one epoxy resin. Epoxy resins are low molecular weight or polymeric compounds having epoxide groups. Suitable epoxy resins for producing plastic materials are known in the prior art and commercially available. If the epoxy resins have a defined, exact number of epoxide groups per molecule, they preferably have at least two epoxide groups per molecule, for example, two, three, four or more epoxide groups per molecule. If the epoxy resins are polymers having varying numbers of epoxide groups in the molecule, the epoxy resin must have on average more than one epoxide group per molecule in order to achieve overall crosslinking. The epoxy resin then preferably contains an average of at least two, at least three or at least four epoxide groups per molecule. According to the invention, mixtures of different epoxy resins can be used, for example, of two, three or more different epoxy resins.

The epoxy resin having on average more than one epoxide group per molecule is preferably a liquid epoxy resin. Such liquid resins contain freely movable polymer molecules not yet cross-linked. Preferably, it is not a polymer dispersion of already cured epoxy resin particles.

Epoxy resins are frequently ether compounds, in particular polyethers. In a preferred embodiment of the invention the epoxy resin is a glycidyl ether. It preferably has two, three, four or more glycidyl groups per molecule, or, preferably, on average at least two, three, four or more glycidyl groups per molecule. Preferred polymers are those having terminal glycidyl groups.

Epoxy resins are often condensates of glycidyl compounds and polyalcohols, in particular diols. Preferred are epoxy resins or condensates or polymers that were produced using bisphenols. Bisphenols are a group of chemical compounds bearing two hydroxyphenyl groups. The glycidyl compound epichlorohydrin is often used as a reactant.

Preferred epoxy resins have formula (X)

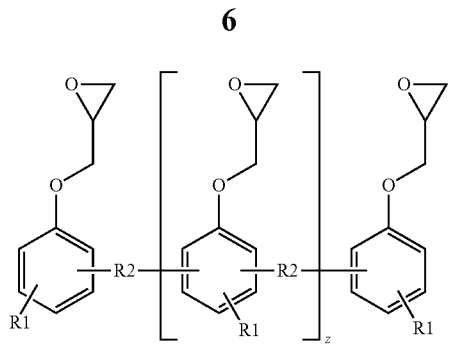

wherein

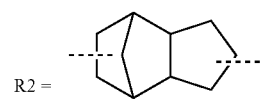

or $CH_2$, R1=H or methyl, and z=0 to 7.

In particular, these are phenol or cresol novolacs (R2=$CH_2$).

Such epoxy resins are commercially available under the trade name EPN or ECN and Tactix®556 from Huntsman or the product series D.E.N.™ from Dow Chemical.

The epoxy resin composition preferably further contains at least one reactive diluent. Epoxy resin reactive diluents serve to control the reaction. They may be low-viscosity, aliphatic or cycloaliphatic epoxy compounds such as glycidyl ethers. The reactive diluents are preferably monofunctional glycidyl ethers such as C12-C14 monoglycidyl ether, difunctional glycidyl ethers such as butanediol diglycidyl ether or hexanediol diglycidyl ether, trifunctional glycidyl ethers such as trimethylolpropane triglycidyl ether, aliphatic polyols having one, two, three or more functional glycidyl ether groups. Also suitable are epoxidized soybean oil or linseed oil, acetoacetate-containing compounds, in particu-

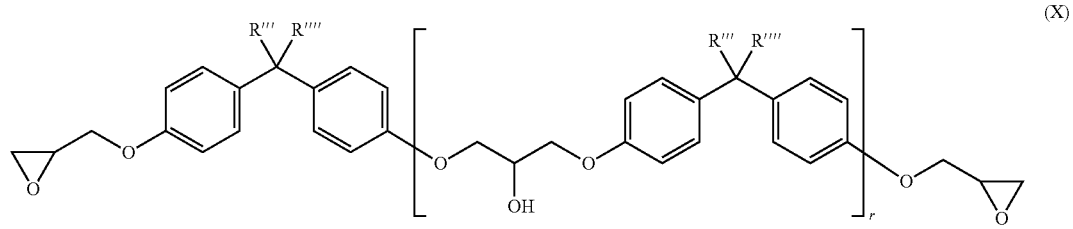

(X)

Here, the substituents R''' and R'''' independently of one another represent H or $CH_3$. Furthermore, the subscript r represents a value of 0 to 1. Preferably, r represents a value of less than 0.2.

Therefore preferably diglycidyl ethers of bisphenol A (DGEBA), of bisphenol F and of bisphenol A/F are used. The designation "A/F" here refers to acetone and formaldehyde, used among other things as reactants in the preparation. Such liquid resins are available, for example, as Araldite® GY250, Araldite® PY304, Araldite® GY2 82 (Huntsman) or D.E.R.™ 331 or D.E.R.™ 330 (Dow) or Epikote 828 or Epikote 862 (Hexion).

Also suitable as epoxy resin are so-called novolacs. They have in particular the following formula:

lar acetoacetylated polyols, butyrolactone, and further isocyanates and reactive group-containing silicones.

The composition according to the invention additionally contains at least one curing agent for epoxy resins. Common and known compounds which react with the epoxide groups may be used as the curing agent. Thereby, the epoxy resin is cross-linked. Curing agents are preferably basic curing agents, in particular amine compounds or amides. Preferably, the curing agents contain at least two primary or secondary amino groups per molecule. Amine compounds having two or more amino groups per molecule are hereinafter referred to as "polyamines." If the polyamines are polymers, they contain on average at least two amino groups per molecule. According to the invention, mixtures of different curing agents may be used, for example, of two, three or more different curing agents.

In a preferred embodiment of the invention the curing agent contains at least one polyamine, which is preferably selected from the group consisting of aliphatic, cycloaliphatic or arylaliphatic primary diamines, triamines and tetramines, polyamines with more than four amine groups per molecule, secondary amino group-containing polyamines, amine/polyepoxide adducts, poly(ethylene imines), polyamidoamines, polyetheramines and amino group-terminated butadiene/acrylonitrile copolymers.

Polyamines are also polyoxyalkylene diamines with molecular weight below 500 g/mol (Jeffamine® D-230, Jeffamine D400, Jeffamine® EDR-148), 4,7,10-trioxatridecane-1-13-diamine, 4,9-dioxadodecane-1,12-diamine, ethylene diamine and/or 3(4),8(9)-bis-(aminomethyl)-tricyclo [5.2.1.0$^{2,6}$]decane (TCD Diamine®, manufactured by Celanese Chemicals).

Other polyamines that are suitable as curing agents are, for example:

Aliphatic, cycloaliphatic or arylaliphatic primary diamines, for example, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methyl-pentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediannin (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)-methane (H$_{12}$-MDA), bis-(4-amino-3-methylcyclohexyl)-methane, bis-(4-amino-3-ethylcyclohexyl)-methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(aminomethyl)-cyclohexane, 1,3-cyclohexylenebis-(methylamine), 2,5(2,6)-bis-(aminomethyl)-bicyclo[2.2.1]heptane (NBDA), 3 (4),8(9)-bis-(aminomethyl)-tricyclo[5.2.1.0$^{2,6}$]decane, 1,4-diamino-2,2,6-trimethylcyclohexane (TMCDA), 1,8-menthane diamine, 3,9-bis-(3-aminopropyl)-2,4,8,10-tetraoxaspiro[5.5]undecane as well as 1,3- and 1,4-xylylenediamine;

Ether group-containing aliphatic primary diamines; for example bis-(2-aminoethyl)-ether, 3,6-dioxaoctane-1 8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis-(3-aminopropyl)-polytetrahydrofurans and other polytetrahydrofuran diamines with molecular weights in the range of, for example, 350 to 2000 and polyoxyalkylene diamines. The latter are typically products from the amination of polyoxyalkylene diols and are for example available under the name Jeffamine® (Huntsman), under the name polyether amine (from BASF) or under the name PC Amines® (from Nitroil). Particularly suitable polyoxyalkylene diamines are Jeffamine® D-230, Jeffamine® D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; polyether amine D 230, polyether amine D 400 and polyether amine D 2000, PC Amine® DA 250, PC Amine® DA 400, PC Amine® DA 650 and PC Amine® DA 2000;

secondary amino group-containing polyamines; for example, diethylenetriamine (DETA), N,N-bis-(2-aminoethyl)-ethylenediamine, dipropylenetriamine (DPTA), bis-hexamethylenetriamine (BHMT), 3-(2-aminoethyl)-aminopropylamine, triethylenetetramine, tetraethylenepentamine, N3-(3-aminopentyl)-1,3-pentanediamine, N5-(3-aminopropyl)-2-methyl-1,5-pentanediamine, N5-(3-amino-1-ethylpropyl)-2-methyl-1, 5-pentanediamine, N,N'-dibutylethylenediamine; N,N'-di-tert-butylethylenediamine, N,N'-diethyl-1,6-hexanediamine, 1-(1-methylethylamino)-3-(1-methylethyl-aminomethyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)-cyclohexyl)-methane, 4,4'-trimethylene dipiperidine, N-alkylated polyetheramines, for example, Jeffamine® types SD-231, SD-401, SD-404 and SD-2001 (from Huntsman);

amine/polyepoxide adducts; particularly adducts of the aforementioned polyamines with diepoxides in a molar ratio of at least 2/1, in particular in the molar ratio of 2/1 to 10/1;

polyamidoamines, which are reaction products of a mono- or polybasic carboxylic acid or esters or anhydrides thereof, in particular reaction products of a dimer fatty acid and an aliphatic, cycloaliphatic or aromatic polyamine used in a stoichiometric excess, in particular a polyalkylene amine such as DETA or triethylenetetramine (TETA), in particular the commercially available polyamidoamines Versamid® 100, 125, 140 and 150 (from Cognis), Aradur® 125, 140, 223, 250 and 848 (from Huntsman), Euretek® 3607, Euretek® 530 (from Huntsman), Beckopox® EH 651, EH 654, EH 655, EH 661 and EH 663 (from Cytec);

polyethyleneimines (PEI), which are branched polymeric amines from the polymerization of ethyleneimine. A suitable polyethyleneimine typically has an average molecular weight in the range of 250 to 25,000 g/mol and contains tertiary, secondary and primary amino groups. Polyethyleneimines are available, for example, under the trade name Lupasol® (from BASF), for example Lupasol® WF, Lupasol® FG, Lupasol® G20 and Lupasol® PR 8515.

Mannich bases; namely amines with further functional groups, which are obtainable by the Mannich reaction in which an aminoalkylation of CH-acidic compounds with an aldehyde and ammonia, or a primary or secondary amine takes place.

Acidic curing agents can also be used as the curing agents, in particular acid anhydrides. Catalytically active curing agents such as fluorides can also be used, for example, boron trifluoride.

The epoxy resin composition according to the invention contains inorganic fillers. The inorganic fillers are preferably mineral fillers. The inorganic fillers may be of natural origin or produced artificially. Suitable fillers are known in the prior art and commercially available. They are used in particular to increase the stability of the epoxy resin and to save epoxy resin. They may also perform other functions, for example, as pigments for coloring, to control the rheology or as fire retardants. The fillers can be synthetic fillers or naturally occurring minerals. They are preferably oxygen-containing compounds. Usually, oxides, mixed oxides or salts of metals and semi-metals, in particular silicon, are used. The fillers can also be metallic such as aluminum, in particular in the form of aluminum powder. In a preferred embodiment, the fillers are not metals.

The inorganic fillers are preferably selected from silicon compounds such as silica, silicates and precipitated and fumed silicas; metal oxides such as titanium dioxide, iron oxide, alumina, zinc oxide and magnesium oxide; metal carbonates such as calcium carbonate or dolomite; metal sulfates such as calcium sulfate (gypsum) and barium sulfate; metal hydroxides such as aluminum hydroxide, nitrides or carbides, clay minerals such as kaolin, fly ash, cement, glass and ceramic materials.

The silica may be for example quartz, e.g., in the form of quartz powder or quartz sand. The silicate may be, for example, talc, mica or wollastonite. The sulfate may be, for example barite (heavy spar, barium sulfate). Mixtures of different fillers and/or different fractions of a filler having different sizes may be used also. The fillers may have customary forms. In particular, powders can be used, as well as hollow spheres (for example made of glass or ceramic) or fibers.

The fillers are coated with the polycarboxylate ethers. Preferably, apart from that, the fillers are not coated and in particular are not provided with a covalently bound surface coating. According to the invention it has been found that simple non-surface-treated inorganic fillers may be incorporated in epoxy resin compositions and processed efficiently in the presence of dissolved polycarboxylate ethers as a dispersing agent. It is therefore not necessary according to the invention that the fillers additionally be surface coated covalently, for example, previously made hydrophobic. Notwithstanding this, according to the invention, however, pre-treated or pre-coated or surface-modified fillers can be used.

The size of the fillers and the particle size distribution are selected in view of the desired properties of the epoxy resin composition and of the cured epoxy resin. The fillers used according to the invention may therefore be of any particle size, for example from 1 urn to 1 cm, in particular between 10 urn and 6 mm. The average particle size of the fillers, for example, may be between 10 urn and 3 mm. The particle size and particle size distribution of fillers can be determined by screen analysis or by microscopic examination. In a particularly preferred embodiment, the inorganic fillers are finely divided fillers, or the fillers have a proportion of finely divided fillers, which is preferably added during production as a finely divided filler fraction. It has been found according to the invention that polycarboxylate ethers are particularly efficient in the presence of finely divided fillers as a dispersing agent in epoxy resin compositions. Finely divided fillers are in particular fillers with absolute particle sizes less than 60 μm. Finely divided fillers are in particular fillers having an average particle size of less than 50 μm, less than 30 μm or less than 10 μm. Here, the particle size of the finely divided fillers can be at least 0.5 μm, at least 1 μm or at least 2 μm. Preferably, the finely divided fillers have particle sizes from 0.5 to 60 μm, in particular between 1-30 μm. In a preferred embodiment of the invention a mixture of different fillers and/or fractions of the same filler are/is used, which have different particle sizes. For example, a mixture of finely divided fillers with absolute particle sizes less than 60 μm and coarser fillers with absolute particle sizes of 60 μm to 1 cm can be used. Preferably, the finely divided fillers are coated with the polycarboxylate ether. Optionally, further fractions of inorganic fillers, which are not finely divided fillers, may be coated as well. However, proportions of finely divided fillers or coarser fillers that are not coated may be included as well.

In a preferred embodiment of the invention, the inorganic fillers comprise a proportion of finely divided fillers, which is preferably coated, and which is at least 5 wt. %, preferably at least 10 wt. %, at least 50 wt. %, at least 80 wt. % or at least 95 wt. %, based on the total weight of all inorganic fillers. Here, the epoxy resin composition may also contain only finely divided fillers as the fillers.

In one embodiment of the invention, only a portion of the fillers is coated with polycarboxylate ethers, while the remaining fillers are not coated. Preferably, a filler fraction is coated, the average particle size of which is smaller than that of the non-coated fillers. Preferably, only one filler fraction with absolute particle sizes less than 100 μm, less than 60 μm or less than 20 μm is coated. Here, for example, between 5 and 100 wt. %, preferably between 5 and 90 wt. % or between 5 and 60 wt. %, in particular between 10 and 60 wt. % or between 10 and 30 wt. % are coated, based on the total weight of all inorganic fillers in the epoxy resin composition. As a result, overall polycarboxylate ether may be saved, wherein advantageous properties are achieved at least in part.

The epoxy resin composition according to the invention contains at least one polycarboxylate ether. Suitable polycarboxylate ethers are used in the prior art as dispersing agents for hydraulically setting compositions, in particular gypsum and cement. Polycarboxylate ethers are comb polymers with a main chain having carboxy groups, and side chains having ether groups, inter alia. The polycarboxylate ethers usually have side chains with polyether groups, in particular based on polyethylene glycol and/or polypropylene glycol. According to the invention, the term "polycarboxylate ether" refers to compounds which have ether groups, wherein they may have other groups, in particular ester and amide groups. In the prior art, the polycarboxylate ethers according to the invention are therefore also referred to as "polycarboxylate esters". According to the invention, mixtures of different polycarboxylate ethers can be used.

Preferably, the polycarboxylate ether has side chains which are attached to a main chain via ester, amide and/or ether groups. The main chain has at least one acid moiety A or a salt thereof, which is preferably an acrylic acid moiety and/or a methacrylic acid moiety. The polycarboxylate ether is preferably produced by esterification and/or amidation of a polycarboxylic acid or a salt or anhydride thereof.

An acid moiety A is usually introduced into the polymer by performing the polymerization in the presence of a corresponding acid monomer, which is usually unsaturated, or a salt or anhydride thereof. Suitable acid monomers are in particular α-unsaturated mono- or dicarboxylic acids, in particular, acrylic acid, methacrylic acid, maleic anhydride, maleic acid, itaconic acid, crotonic acid or fumaric acid.

In a preferred embodiment of the invention, the polycarboxylate ether comprises:

a) at least one acid moiety A of formula I):

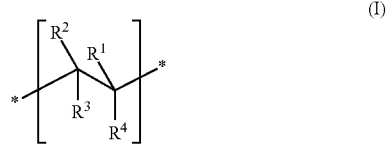

(I)

wherein each $R^1$, $R^2$ and $R^3$ independently of one another represents H, —COOM, —CH$_2$COOM or an alkyl group having 1 to 5 carbon atoms, each $R^4$ independently of one another represents —COOM, —CH$_2$COOM, —SO$_2$—OM, —O—PO(OM)$_2$ and/or —PO(OM)$_2$;

or wherein $R^3$ together with $R^4$ forms a —CO—O—CO— ring; wherein M represents H, an alkali metal, an alkaline earth metal, ammonium, an ammonium cation, an organic ammonium compound, or mixtures thereof; with the proviso that overall a single one or two of $R^1$, $R^2$, $R^3$ and $R^4$ is/are acid groups, wherein the acid moiety A is preferably an acrylic acid moiety or a salt thereof and/or a methacrylic acid moiety or a salt thereof; and b) at least one structural moiety B of formula (II);

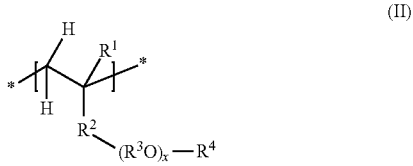

(II)

wherein $R^1$ independently of one another represents H or CH$_3$.

$R^2$ independently of one another represents an ester group —CO—O— or an amide group —CO—NH—;

$R^3$ independently of one another represents a $C_2$-$C_6$ alkylene group, in particular an ethylene or propylene group, $R^4$ independently of one another represents H, a $C_1$-$C_{12}$ alkyl or cycloalkyl radical, a $C_7$-$C_{20}$ alkylaryl or aralkyl radical, or a substituted or unsubstituted aryl radical, or a monovalent organic radical having 1 to 30 carbon atoms, which optionally comprises heteroatoms, and x independently of one another represents a value between 3 and 250, preferably between 5 and 150.

Thus, the main chain of the polycarboxylate ether is a linear copolymer wherein said structural moiety B is a component of said linear copolymer.

The at least one acid moiety A, in particular the at least one acrylic acid moiety and/or the at least one methacrylic acid moiety may be partially or completely neutralized. The acid moiety may be present as free acid or as a salt or partial salt or anhydride, where the term "salt" here and below, in addition to the classical salts such as are obtained by neutralization with a base, also comprises complex-chemical compounds between metal ions and the carboxylate or carboxyl groups as ligands. The classical salts are obtained in particular by neutralization with sodium hydroxide, calcium hydroxide, magnesium hydroxide, ammonium hydroxide or an amine.

The structural moiety B of formula (I) may be an ester or an amide depending on the selection of the group $R^2$. Here, a polycarboxylate ether may contain both ester and amide groups.

In a preferred embodiment of the invention, the polycarboxylate ether has at least one structural moiety B of formula (I) where $R^1$ is H, and at least one structural moiety B of formula (I) where $R^1$ is CH$_3$, wherein $R^2$ is preferably an ester group. That is, in a preferred polycarboxylate ether a part of the structural moieties B represents polyoxyalkylene acrylate moieties, and another part of the structural moieties B represent polyoxyalkylene methacrylate moieties.

In a preferred embodiment, —(R$^3$O)$_x$— represents a $C_2$ to $C_4$ polyoxyalkylene group, in particular a polyoxyethylene group or polyoxypropylene group or mixtures of oxyethylene and oxypropylene moieties in any order such as random, alternating or blockwise.

$R^4$ is preferably not H, and particularly preferably is a methyl radical.

In a preferred embodiment of the invention, the polycarboxylate ether has a proportion of ethylene oxide moieties of at least 30 mol %, preferably 50 to 100 mol %, in particular 80 to 100 mol % of the total number of all (R$^3$O)$_x$ moieties. Particularly preferably ethylene oxide and propylene oxide moieties are present in the polycarboxylate ether.

In a preferred embodiment of the invention, the polycarboxylate ether has at least one further structural moiety C, which is different from the structural moieties A and B, and which is selected from an ether, ester, amide or imide moiety, an acid moiety selected from carboxylic acid, sulfonic acid, phosphonic acid, phosphoric acid esters, carbonylamidomethyl propanesulfonic acid and salts thereof, or a polyoxyalkylene oxycarbonyl, polyoxyalkylene aminocarbonyl, polyoxyalkylene oxyalkyl, polyoxyalkylenoxy, hydroxyethyloxycarbonyl, acetoxy, phenyl, or N-pyrrolidonyl group. Preferably, the additional structural moiety C comprises polyoxyalkylene groups, preferably polyoxyethylene groups, polyoxypropylene groups or mixtures thereof. For example, the structural moiety C may be an ester moiety which is produced by reaction of a mono- or dicarboxylic acid with an alkyl alcohol, in particular a $C_6$-$C_{20}$ alkyl alcohol.

The polycarboxylate ether may be a combination of different structural moieties of the respective structural moieties of A, B and optionally C. For example, several acid moieties A which are not at all or completely neutralized, may be present in the polycarboxylate ether as a mixture. Alternatively, several different ester and/or amide moieties B as a mixture may be present in the polycarboxylate ether, for example, several ester moieties B having different substituents $R^3$. Preferred is, for example, the joint use of polyoxyalkylenes, in particular polyoxyethylene with polyoxypropylene, or the joined use of polyoxyalkylenes, in particular polyoxyethylene, of different molecular weight.

In a preferred embodiment of the invention, the polycarboxylate ether comprises a) 5 to 95 mol %, preferably 10 to 80 mol %, particularly preferably 20 to 60 mol % acid moieties A, in particular acrylic acid moieties and/or methacrylic acid moieties;

b) 5 to 50 mol %, preferably 10 to 40 mol % structural moiety B; and c) 0 to 30 mol %, preferably 0 to 15, in particular 0 to 5 mol % structural moiety C, each based on the total number of monomeric moieties in the main chain of the polycarboxylate ether.

The sequence of the individual structural moieties A, B, and C in the polycarboxylate ether may be alternating, statistical, blockwise or random.

The polycarboxylate ether preferably has an average molecular weight $M_n$ in the range of 1000 to 100,000 g/mol, preferably 2000 to 70,000 g/mol, particularly preferably 5000 to 50,000 g/mol.

Suitable polycarboxylate ethers are commercially available, for example, from Sika AG, CH, under the brand name Sika Visocrete.

The polycarboxylate ethers are preferably produced by the polymer-analogous reaction. The polymer-analogous reaction has the advantage that by varying the amount, type and ratio of alcohols and amines, polycarboxylate ethers with very different and advantageous structures and properties can be obtained from polycarboxylic acids. It has surprisingly been found that by the use according to the invention of polycarboxylate ethers which have been produced by polymer-analogous reaction, particularly advantageous properties are achieved, wherein in particular the workability of cement compositions is ensured over long periods of time. The different properties are likely to be obtained by different distributions of the side chains in the polymer.

Polymer-analogous reactions are known per se and are described, for example, in WO97/35814A1, WO95/09821A2, DE 100 15 135 A1, EP 1138697 A1, EP 1348729 A1, and WO2005/090416 A1. Details about the polymer-analogous reaction are disclosed, for example, in EP 1 138 697 B1 on page 7, line 20 to page 8, line 50, and in the examples included, or in EP 1 061 089 B1 on page 4, line 54 to page 5, line 38 and in the examples.

The polymer used according to the invention may be produced also by a free radical polymerization reaction, wherein the copolymer is obtained from corresponding ethylenically unsaturated acid, ester and amide monomers in the presence of a free radical generator. The route via free radical polymerization is the method most commonly used in the prior art.

Depending on the reaction conditions, the polycarboxylate ether may be used as a reaction product, which, in addition to the polycarboxylate ether, contains free compounds of the starting materials, in particular free monohydroxy compounds such as unilaterally end group-capped polyoxyalkylene, in particular free methoxy-polyoxyethylene.

In a preferred embodiment of the invention, the epoxy resin composition according to the invention is provided as a multi-component system. Curable epoxy resin compositions are regularly provided to the user as multi-component systems. In this case, the epoxy resin and the curing agent are regularly contained in different components, so that the curing reaction can take place only when the user mixes the components. The coated fillers may be part of one or both of these components or part of an extra (filler) component. The invention also relates to a multi-component system for producing a curable epoxy resin composition according to the invention, comprising at least one component K1 containing said at least one epoxy resin, and
optionally a curing agent component K2 containing said at least one curing agent or a catalyst,
wherein at least one curing agent is contained in said component K1 or K2,
wherein said at least one inorganic filler coated with the polycarboxylate ether is contained in said component K1, K2, and/or a further component K3.

When a curing agent is contained in said component K1, it is preferably a latent curing agent. Latent curing agents only take effect after they are activated, in particular by catalysts or elevated temperature. When a latent curing agent is contained in component K1, then a catalyst may be used for the activation of the curing agent in component K2. If a non-latent curing agent is used, it is not contained in component K1, but rather in a separate component, preferably a curing agent component K2.

The inorganic filler and the at least one polycarboxylate ether are contained in the same component K3, K2 or K1. Particularly preferred is a multi-component system in which the inorganic fillers and the polycarboxylate ethers are contained in an additional component K3.

Preferably, the multi-component system is a three-component system. According to the invention it has been found that such a multi-component system with at least three components ensures a particularly good durability of the individual components over extended periods of time. Particularly when said component K1 is non-aqueous, it is preferred that the polycarboxylate ethers are not contained in this component K1, as they are often insufficiently soluble in the more hydrophobic epoxy resins. It is generally preferred that the polycarboxylate ethers are contained in the separate filler component K3.

In a preferred embodiment of the invention, the multi-component system according to the invention comprises a component K3, which contains the filler, the polycarboxylate ether and a solvent. Here, the filler is coated with the polycarboxylate ether, in particular by impregnating with a solution or suspension including said polycarboxylate ether and said solvent.

The epoxy resin composition according to the invention and the multi-component system may contain other conventional additives. A plurality of additives is well-known in the technical field of epoxy resins that influence the properties of the curable compositions or the cured epoxy resins. The proportion of additives in the epoxy resin composition which is contained in addition to epoxy resins, curing agents, polycarboxylate ethers and inorganic fillers, can be—including solvent—for example, up to 50 wt. %, up to 20 wt. %, up to 5 wt. %, or up to 2 wt. %. In a preferred embodiment of the invention, at least one further additive selected from reactive diluents, plasticizers, solvents, film-forming agents, extenders, catalysts, accelerators, polymers, rheology modifiers, adhesive promoters, stabilizers, defoamers, deaerating agents, flame retardants, surfactants, biocides, organic dyes and pigments and other dispersing agents is contained. These include, for example:

Solvents, film-forming agents or extenders such as aromatic solvents such as toluene, xylene or benzyl alcohol, methyl ethyl ketone, 2-ethoxyethanol, 2-ethoxyethyl acetate, aliphatic alcohols such as ethanol, propanol or butanol, benzyl alcohol, phenols such as nonylphenol or nonylphenol ethoxylates, ethers or polyethers such as ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthaiene, petroleum fractions such as Solvesso types (from Exxon) such as Solvesso 200, aromatic hydrocarbon resins, in particular phenol group-containing types, sebacates, phthalates, mineral oil fractions, naphtha, aromatic naphtha, organic phosphoric and sulfonic esters, and sulfonamides;

Polymers having functional groups, such as polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, particularly from the group comprising ethylene, propylene, butylene, isobutylene, isoprene, vinyl acetate and alkyl (meth)acrylates, in particular chlorosulfonated polyethylenes and fluorine-containing polymers, sulfonamide-modified melamines and purified montan waxes;

organic dyes;

accelerators, which accelerate the reaction between amino groups and epoxide groups, for example, acids or compounds hydrolyzable to form acids, for example organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids such as phosphoric acid, or mixtures of the aforementioned acids and acid esters; furthermore tertiary amines such as 1,4-diazabicyclo[2.2.2]octane, benzyldimethylamine, α-methylbenzyldimethylamine, triethanolamine, dimethyl aminopropylamine, salts of such tertiary amines, quaternary ammonium salts such as benzyltrimethyl ammonium chloride, phenols, in particular bisphenols, phenolic resins and Mannich bases such as 2-(dimethylaminomethyl)-phenol and 2,4,6-tris-(dimethylaminomethyl)-phenol, phosphites such as di- and triphenyl phosphites, and mercapto group-containing compounds such as those already mentioned above; catalysts;

rheology modifiers such as in particular thickening agents, for example layer silicates such as bentonites, derivatives of castor oil, hydrogenated castor oil, polyamides, polyurethanes, urea compounds, fumed silicas, cellulose ethers and hydrophobically modified polyoxyethylenes;

adhesion promoters, for example, organoalkoxysilanes such as 3-glycidoxypropyl trimethoxysilane, 3-aminopropyl-trimethoxysilane, N-(2-aminoethyl)-3-aminopropyl-trimethoxysilane, N-(2-aminoethyl)-N'-[3-(trimethoxysilyl)-propyl]-ethylene diamine, 3-ureidopropyl trimethoxysilane, 3-chloropropyl trimethoxysilane, vinyl trimethoxysilane, or the corresponding organosilanes with ethoxy groups or (poly) etheroxy groups instead of the methoxy groups;

stabilizers against oxidation, heat, light and UV radiation;

flame retardants, in particular compounds such as aluminum hydroxide ($Al(OH)_3$; also referred to as ATH for "aluminum trihydrate"), magnesium hydroxide ($Mg(OH)_2$; also referred to as MDH for "magnesium dihydrate"), ammonium sulfate (($NH_4)_2SO_4$), boric acid ($B(OH)_3$), zinc borate, melamine borate and melamine cyanurate; phosphorus-containing compounds such as ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl)phosphate, trioctyl phosphate, mono-, bis- and tris-(isopropylphenyl)phosphate, resorcinol-bis-(diphenyl phosphate), resorcinol diphosphate oligomer, tetraphenyl-resorcinol diphosphate, ethylenediamine diphosphate and bisphenol A-bis-(diphenyl phosphate); halogen-containing compounds such as chloroalkyl phosphates, in particular tris-(chloroethyl)phosphate, tris-(chloropropyl)phosphate and tris-(dichloroisopropyl)phosphate, polybrominated diphenyl ethers, in particular decabromodiphenyl ether, polybrominated diphenyl oxide, tris-[3-bromo-2,2-bis-(bromomethyl)-propyl]phosphate, tetrabromo-bisphenol A, bis-(2,3-dibromopropyl ether) of bisphenol A, brominated epoxy resins, ethylene-bis-(tetrabromophthalimide), ethylene-bis-(dibromonorbornane-dicarboximide), 1,2-bis-(tribromophenoxy)ethane, tris-(2,3-dibromopropyl) isocyanurate, tribromophenol, hexabromocyclododecane, bis-(hexachlorocyclopentadieno)cyclooctane and chlorinated paraffins;

surfactants such as wetting agents, leveling agents, deaerating agents or defoamers;

additional fillers such as organic fillers such as organic polymers, e.g., as a powder or hollow beads such as PVC powder or hollow PVC-beads; plastic fibers or natural fibers, or other inorganic fillers, which are not coated with polycarboxylate ethers, for example, fly ashes, carbon black, graphite, titanates, metal powders such as aluminum, copper, iron, silver or steel;

biocides such as algicides, fungicides or fungal growth inhibitors;

further dispersing agents and liquefiers different from polycarboxylate ethers such as surfactants, phosphate esters with long-chain polyether components, lignin sulfonates, melamine-formaldehyde sulfonates or naphthalene-formaldehyde sulfonates. The uniform distribution of the fillers in the epoxy composition can be improved in individual cases if other dispersing agents are included.

The polycarboxylate ether is preferably used in an amount of 0.01 to 2 wt. %, more preferably 0.02 to 1 wt. %, even more preferably 0.1 to 0.5 wt. % polycarboxylate ether, based on the weight of the filler. The polycarboxylate ether can be added to the filler separately or premixed as a dispersing agent in solid or liquid form. The polycarboxylate ether is preferably used in dissolved form or as a suspension.

The proportion of the polycarboxylate ether in the epoxy resin composition is preferably less than 2 wt. %, preferably less than 1 wt. %, even more preferably less than 0.5 wt. %, based on the weight of the epoxy resin composition. The polycarboxylate ether is preferably used in an amount of 0.01 to 2 wt. %, preferably 0.01 to 1 wt. %, even more preferably 0.05 to 0.5 wt. % polycarboxylate ether, based on the weight of the epoxy resin composition.

In a preferred embodiment of the invention, the multi-component system comprises at least one component K1 containing at least one epoxy resin,
one component K2 containing at least one curing agent, and one solid component K3, containing
(a) 93 to 99.97 wt. %, preferably 96 to 99.88 wt. %, even more preferably 98 to 99.7 wt. % inorganic fillers,
(b) 0.01 to 2 wt. %, preferably 0.02 to 1 wt. %, even more preferably 0.1 to 0.5 wt. % polycarboxylate ether, and
(c) 0.02 to 5 wt. %, preferably 0.1 to 2.5 wt. %, even more preferably 0.2 to 1.5 wt. % solvent.

The epoxy resin-containing component K1 may additionally contain compatible additives such as reactive diluents, solvents and/or plasticizers. Such additives are usually used in order to lower the viscosity and thus improve the workability.

According to the invention, the curing agent-containing component K2 can consist solely of one or a mixture of various curing agents. The component K2 may additionally contain other suitable and compatible additives such as catalysts or plasticizers. This is particularly advantageous if the curing agent is liquid at room temperature.

The solid component K3 is preferably in powder form, and preferably free-flowing.

In a preferred embodiment, the proportion of filler in the epoxy resin composition and/or in the cured epoxy resin is, based on the total weight, at least 50 wt. %, preferably at least 60 wt. % or at least 70 wt. %, even more preferably at least 80 wt. % or at least 85 wt. % or at least 90 wt. %. Preferably, the filler content is between 50 and 90 wt. %, in particular between 60 and 90 wt. % or between 78 and 90 wt. %. It has been found that high filler contents according to the invention of 80 to 90 wt. % can be incorporated readily into epoxy resin compositions, whereby a good flowability is achieved and stable cured epoxy resins are obtained.

Preferably, based on 100 parts by weight, inorganic fillers are used between 0.01 and 2 parts by weight, in particular between 0.02 to 1 parts by weight, more preferably 0.1 to 0.5 parts by weight of polycarboxylate ether.

The invention also relates to a cured epoxy resin, that is, a cured plastic material, obtainable by curing an epoxy composition according to the invention or by mixing the components and curing a multi-component system according to the invention. The term "epoxy resin" as used herein, in accordance with the common parlance, refers to the cured composition, in which the other ingredients, such as fillers, are integrated. The epoxy resin is cured if no substantial further reaction takes place between the epoxide groups and the curing agent. The cured epoxy resin having a solid consistency may be, for example, a three-dimensional object or component, a coating, a bonding bridge, a putty, a constituent of a laminate, an adhesive, a filling or sealant. Preferably, the filler is uniformly or substantially uniformly distributed in the cured resin.

The cured epoxy resin is structurally different from known epoxy resins and has advantageous properties. With the method according to the invention large amounts of inorganic fillers can be incorporated evenly despite good workability without compromising stability. Because of the high solids content such solids exhibit particularly low shrinkage and a low coefficient of thermal expansion. Preferably, therefore, the cured epoxy resin has a high content of inorganic fillers.

The invention also relates to the use of polycarboxylate ethers as a dispersing agent for inorganic fillers in curable epoxy resin compositions. In this context, the term "dispersing agent" means that the polycarboxylate ethers generally promote the mixing of the components of the liquid or pasty epoxy resin composition, in particular the mixing of fillers with the epoxy resin. In a preferred embodiment the polycarboxylate ethers are used as flow improvers. This means that the polycarboxylate ether increases the flowability of an epoxy resin composition containing inorganic fillers, as compared to an identical composition that does not contain said polycarboxylate ether. The dispersing agent can also prevent separation of the filler-containing epoxy resin composition.

The invention also relates to the use of an epoxy resin composition according to the invention or a multi-component system according to the invention for bonding, coating or sealing of substrates and/or for producing moldings. The multi-component system is used by mixing the components first, so that a curable epoxy resin composition according to the invention is obtained. After incorporating all components and optionally activation, curing takes place. Here, further components or additives may be added.

The invention also relates a solid filler which is coated with a polycarboxylate ether, containing
  (a) 93 to 99.97 wt. %, preferably 96 to 99.88 wt. %, even more preferably 98 to 99.7 wt. % inorganic fillers,
  (b) 0.01 to 2 wt. %, preferably 0.02 to 1 wt. %, even more preferably 0.1 to 0.5 wt. % polycarboxylate ether, and
  (c) 0.02 to 5 wt. %, preferably 0.1 to 2.5 wt. %, even more preferably 0.2 to 1.5 wt. % organic solvent.

In this case, the sum of the fillers, polycarboxylate ethers and organic solvents is preferably 100%. The solid filler is suitable for use as component K3 for a multi-component system according to the invention. The filler coated with PCE can also be incorporated as a filler component in K1 or K2.

The invention also relates to a process for producing a component K3 for a multi-component system according to the invention, comprising the steps of
  (i) providing from 93 to 99.7 wt. % inorganic fillers,
  (ii) impregnating with a solution or suspension made of
    0.01 to 2 wt. % polycarboxylate ether and
    0.02 to 5 wt % organic solvent,
  wherein the sum of the fillers, polycarboxylate ethers and organic solvents is preferably 100%.

In a preferred embodiment no removal of the solvent is done. In this case, the amount of the solvent is preferably set so that it is completely absorbed by the inorganic fillers, so that a powdered filler composition is obtained. After impregnation the solvent or at least a portion of the solvent, may also be removed, for example by drying.

The component K3 may be provided, for example, as powders, flakes, pellets or granules. Such solid additives are easy to transport and store.

The dispersing agent may be used in particular as a liquefier to improve the workability and/or to improve the flowability of the curable epoxy resin compositions. In the use according to the invention the epoxy resins exhibit improved flowability. In the use according to the invention, both the flow rate and the flow distance are preferably improved. The flowability can be determined using the flow spread after 10 min, 20 min or 30 min, respectively, in each case after mixing of all components, including the curing agent and the epoxy resins. According to the invention it was surprising that polycarboxylate ethers in non-aqueous epoxy resin compositions can develop a dispersing and liquefying action. This could not be expected, since polycarboxylate ethers are usually used in cement compositions that are aqueous and also strongly basic, where the polycarboxylate ethers are soluble in the matrix, and therefore differ significantly from curable epoxy resin compositions.

Preferably by the addition of polycarboxylate ethers according to the invention, for example, in an amount of 0.05 wt. % or 0.1 wt. %, the flow spread or flowability of an epoxy resin composition immediately or after 1, 3, 10 or 30 min after the mixing is increased by more than 5%, preferably more than 10% or more than 20%, compared to an identical composition without the polycarboxylate ether. The flow spread or flowability can be determined as described in the exemplary embodiments and/or in in accordance with DIN EN 13395-1 or DIN EN 1015-3.

The invention solves the underlying problem. According to the invention, a simple and efficient way is provided to improve the workability and flowability of epoxy resin compositions with fillers. By the addition of polycarboxylate ethers the flowability is significantly improved over a long period of time. In addition, the composition can take up a large amount of inorganic fillers. Here, a homogeneous distribution of the filler in the composition can be achieved. Surprisingly, these beneficial effects can already be achieved when the fillers are coated with relatively small amounts of polycarboxylate ethers. This is particularly important at high filler contents, since a high proportion of non-crosslinkable polycarboxylate ethers would reduce the stability of the cured epoxy matrix. The polycarboxylate ethers most likely can exert their beneficial, liquefying effects directly at the filler/epoxy interfaces due to the coating according to the invention.

The epoxy resin composition according to the invention can be provided as a multi-component system and can be produced by mixing the components within a few minutes. The components are readily accessible and manageable and relatively inexpensive. It is not necessary to modify the fillers chemically. Using the polycarboxylate ethers the user can individually set the flowability of various specific epoxy resin compositions. Only small amounts of the polycarboxylate ethers must be used and do not affect adversely the stability of the cured epoxy resins. Through increased filler levels of the epoxy resins, products with improved properties can be produced and raw material costs can be saved, as inorganic fillers are generally less expensive than epoxy resins. The dispersing agents according to the invention need not be bonded covalently with fillers by chemical reactions, which also saves energy costs since no elevated reaction temperatures are required.

FIGURES

FIG. 1 shows the particle size distribution of the component K3 as described in exemplary embodiment 1. The screen residue in weight percent is plotted against the screen size in millimeters.

Figure 2:
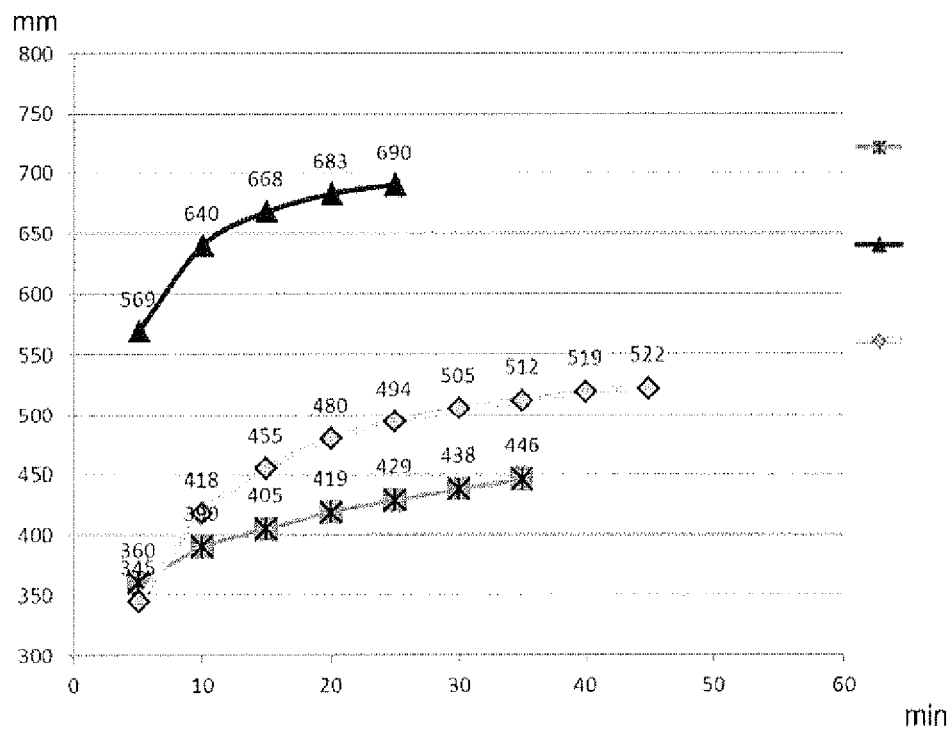

FIG. 2 shows the flowability of compositions E3 and V3 from exemplary embodiment 4 in a flow channel as described in Example 5. The flow distance in millimeters is plotted against the flow time in minutes (from 0 to 60 minutes). The lower curve (squares) shows the flowability of composition V3 without PCE, while the upper curve (triangles) shows the flowability of composition E3 with PCE. In addition, the flowability of composition E4 with PCE with a higher filler content is shown (middle curve, diamonds).

EXEMPLARY EMBODIMENTS

Example 1

Production of a Three-Component System

A three-component system was produced as the basis for an epoxy grout with a filler content of about 82 wt. %.
Component K1: Epoxy Resin

| Component | wt. % |
|---|---|
| Bisphenol A-epichlorohydrin resins with average molecular weight >700 | 74.7 |
| Mixture of silicone-free defoamer, solvent naphtha and 2-methoxy-1-methylethylacetate | 0.3 |
| 1,6-Hexanediol diglycidyl ether | 25 |
| Total | 100 |

The epoxy resin was charged first. All other materials were added and homogenized for about 5 minutes.
Component K2: Curing Agent

| Component | wt. % |
|---|---|
| Triethylenetetramine | 100 |

Component K3: Filler:

| Component | wt. % |
|---|---|
| Quartz sand mixture | 79.5 |
| TiO$_2$ white pigment | 0.45 |
| Cement, particle size <0.06 mm | 20 |
| Iron oxide black | 0.05 |

-continued

| Component | wt. % |
|---|---|
| Polycarboxylate ether solution (20% PCE dissolved in 80% benzyl alcohol) | 1 |
| Total | 101 |

Component K3 is composed of a mixture of different quartz sands with particle sizes in the range of 0.06 mm to 3.2 mm. The particle size distribution of the quartz sand mixture is shown in FIG. 1. In addition, component K3 contains cement as inorganic finely divided filler and a low proportion of titanium dioxide and iron oxide as pigments.

The polycarboxylate is first dissolved in benzyl alcohol. The fillers are successively weighed and placed in a stirred tank (the coarse fillers first, the finely divided fillers last). Then, the polycarboxylate ether/benzyl alcohol mixture is added and mixed for about 5 minutes at RT. A Hobart planetary mixer N50 CE at level 1 was used as the stirring unit.

Example 2

Production of Curable Epoxy Resin Compositions E1 and V1

An epoxy composition E1 according to the invention was prepared by mixing components K1 to 3. The mixing ratio of component K1:K2:K3 was 6:1:35 parts by weight.

For comparison, an epoxy composition V1 was produced whose component K3 did not contain any polycarboxylate ether/benzyl alcohol mixture and which, otherwise, was identical to the composition E1.

Example 3

Determination of the Flowability of Epoxy Resin Compositions E1 and V1

The flowability of epoxy compositions E1 and V1 was determined using a brass cone (about 500 g epoxy resin mortar) in accordance with DIN EN 13395-1 or EN 1015-3 and the flow spread (diameter) was determined after curing. The flow spread without polycarboxylate ether/benzyl alcohol mixture was 265 mm. With a proportion of about 0.85% polycarboxylate ether/benzyl alcohol mixture the flow spread was 310 mm, which is an improvement of about 17%.

Example 4

Production and Evaluation of Curable Epoxy Resin Compositions E2 and V2 with Commercially Available Filler Another three-component system was produced, in which components K1 and K2 corresponded to those described in Example 1 above. The filler component of a commercially available epoxy cement (brand name Masterflow 410 PCT BASF Construction Chemicals) is used as component K3. 0.3 wt. % of a solution of 95 wt. % benzyl alcohol and 5 wt. % polycarboxylate ether were added to this filler component and stirred for 5 min at RT in a planetary mixer.

Components K1 and K2 were mixed in the mixing ratio 6:1 (parts by weight), component K3 was added (mixing ratio K1:K2:K3=6:1:60.9 or (K1+K2):K3=1:8.7) and homogenized for 3 minutes using a spiral mixer or basket mixer, resulting in epoxy resin composition E2. For comparison, an epoxy composition V2 was produced whose component K3 did not contain any polycarboxylate ether/benzyl alcohol mixture and which, otherwise, was identical to composition E2.

In each case, in accordance with DIN EN 13395-1 or EN 1015-3, the material was filled into a brass ring standing on a flat plastic surface. The brass ring was lifted and the spreading of the grout was observed. After curing, the diameter/the flow spread was determined. Composition E2 with polycarboxylate ether/benzyl alcohol flows better and exhibits a flow spread that is increased by about 13% compared to composition V2 without polycarboxylate ether/benzyl alcohol.

The flow spread without polycarboxylate ether/benzyl alcohol mixture was 228 mm. With about 0.3% polycarboxylate ether/benzyl alcohol mixture the flow spread was 258 mm, which is an improvement of about 13%.

Example 5

Production and Evaluation of Curable Epoxy Resin Compositions E3 and V3 with Commercially Available Filler 0.3 wt. % of a solution of 95 wt. % benzyl alcohol and 5 wt. % polycarboxylate ether were added to the filler component of a commercially available epoxy grout (trade name Sikadur-42 LE; Sika Canada) and stirred for 5 minutes at RT in a planetary mixer, resulting in component K3.

Components K1 and K2 were mixed in the mixing ratio 6:1 (parts by weight), component K3 was added (mixing ratio K1:K2:K3=6:1:45.5 or (K1+K2):K3=1:6.5) and homogenized for 3 minutes using a spiral mixer or basket mixer, resulting in epoxy resin composition E3. For comparison, an epoxy composition V3 was produced whose component K3 did not contain any polycarboxylate ether/benzyl alcohol mixture and which, otherwise, was identical to composition E3.

The material is filled into a flow channel according to EN 13395-2 and the flow path is determined as a function of time.

The course of the flow curve over a period of time of about 35 minutes is shown in FIG. 2. Epoxy resin composition E3 flows much faster (steeper rise at the beginning of the curve) and in a comparable time, even further than composition V3. The flow path covered by epoxy resin E3 after 25 minutes is already about 60% greater. Even with an increase in the filler content to a mixing ratio of the liquid components to filler component to (K1+K2):K3=1:8.5 in an epoxy resin composition E4, the grout with PCE is still flowing further than the same grout without PCE at a ratio of the components (K1+K2):K3 of 1:6.5.

In further experiments it was found that for epoxy resin grouts the mixing ratio between liquid binder and filler K3, depending on the desired flowability, can vary, for example, from 1:4 to 1:9 ((K1+K2):K3, gravimetrically) (about 78-90 wt. % filler content). Here, it is advantageous to adapt the concentration of the polycarboxylate ethers in each case.

Example 6

Impact of the Solvent

To exclude the possibility that the solvent causes the improvement of the flowability of compositions according to the invention, comparative experiments were performed with similar quantities of solvent but without polycarboxylate. For this purpose, the flowability of epoxy resin composition with components K1 and K2 in accordance with Example 1 and various filler components N3 (base composition comparable to Example 1, however, without PCE and solvent) was compared. The quantitative ratio was (K1+K2):K3=1:6.5. The differences in the epoxy resin compositions and the results are summarized in the following table. The results show that the polycarboxylate ether significantly improves flowability.

| Components | Flow spread * [approx. ø in mm] |
|---|---|
| K1+ K2 + N3 | 252 mm |
| K1+ K2 + N3 + 0.3% benzyl alcohol | 260 mm |
| K1+ K2 + N3 + 0.03% polycarboxylate ether (Sika Viscocrete-125) + 0.27% benzyl alcohol) | 281 mm |

* Approx. 500 g, measured by cone at 23° C. (DIN EN 13395-1 and EN 1015-3)

Example 7

Epoxy Resin Composition E4

Another epoxy resin composition E4 based on a three-component system was produced and tested. The production of the components, processing and determination of the flow spread were carried out as described for Examples 1 to 3 above, unless described differently hereinafter. A three-component system was produced as a basis for an epoxy resin coating having a filler content of about 63 wt. %.

Component K1: Epoxy Resin

| Component | wt. % |
|---|---|
| Bisphenol A-epichlorohydrin resin with an average molecular weight >700 | 85 |
| C12/C14-alkyl glycidyl ether | 10 |
| Heavy aromatic solvent naphtha (petroleum) | 4.9 |
| Mixture of solvent naphtha and 2-methoxy-1-methylethylacetate | 0.1 |
| Total | 100 |

Component K2: Curing Agent

| Component | wt. % |
|---|---|
| Benzyl alcohol | 40 |
| Isophorone diamine | 25 |
| Triethylenetetramine | 20 |
| Heavy aromatic solvent naphtha (petroleum) | 15 |
| Total | 100 |

Component K3: Filler:

| Component | wt. % |
|---|---|
| Natural $CaCO_3$, <0.06 mm particle size | 60 |
| Quartz powder <0.06 mm particle size | 38.4 |

| Component | wt. % |
| --- | --- |
| TiO₂ white pigment | 1.2 |
| Iron oxide black | 0.1 |
| PCE solution (20% PCE dissolved in 80% benzyl alcohol) | 0.3 |
| Total | 100 |

Component K3 was produced by first dissolving Sika ViscoCrete-125 (Sika, CH) in benzyl alcohol (20 wt. % Sika ViscoCrete-125 and 80 wt. % benzyl alcohol). Quartz powder is charged into the stirred tank and the solution Sika ViscoCrete/benzyl alcohol is added and mixed for 3 minutes using planetary mixer N50 CE (level 1) at RT. After addition of the remaining filler components it is mixed for further three minutes in the planetary mixer at RT. Component K3 contains calcium carbonate and quartz powder as finely divided fillers.

The mixing ratio (gravimetrically) of the individual components in the epoxy resin composition is K1:K2:K3 component=3:1:7; or liquid to filler component (K1+K2):K3=1:1.75 (parts by weight).

Flowability was determined using 150 g samples and the flow spread (diameter) was determined after curing. The flow spread without polycarboxylate ether/benzyl alcohol mixture was 212 mm.

The flow spread with 0.2% polycarboxylate ether/benzyl alcohol mixture was 250 mm. Thus, with the addition of polycarboxylate ether the flow spread could be increased by more than 18%.

Example 8

Impact of the Solvent

Three-component systems and epoxy resin compositions E5 and E6 were produced according to Example 7 with the following modification. Components K3 were produced in a three-component system according to Example 7, wherein one component K3 was coated with 0.3 wt. % benzyl alcohol, another one was coated with a solution of 0.06 wt. % polycarboxylate ether and 0.24 wt. % benzyl alcohol. Flowability was determined using 150 g samples and the flow spread (diameter) was determined after curing. The flow spread of E5 without polycarboxylate ether, only with 0.3% benzyl alcohol, was about 210 mm. The flow spread of E6 with 0.06 wt. % polycarboxylate ether and 0.24 wt. % benzyl alcohol was about 250-260 ram. The increase of the flow spread by approx. 20% shows it is caused by the polycarboxylate ether.

The invention claimed is:

1. A curable epoxy resin composition containing at least one epoxy resin having on average more than one epoxide group per molecule, at least one inorganic filler and at least one polycarboxylate ether, wherein the inorganic filler is coated with the polycarboxylate ether, wherein the polycarboxylate ether has side chains linked to a main chain via ester, amide and/or ether groups, wherein the main chain has at least one acrylic acid moiety or a salt thereof, and/or at least one methacrylic acid moiety or a salt thereof, and/or a maleic anhydride moiety or a salt thereof, and/or a maleic acid moiety or a salt thereof, and/or an itaconic acid moeity or a salt thereof, and/or a crotonic acid moiety or a salt thereof, and/or a fumaric acid moiety or a salt thereof.

2. The epoxy resin composition according to claim 1, wherein the coated inorganic filler was obtained by impregnating with a solution or suspension containing the polycarboxylate ether and a solvent.

3. The epoxy resin composition according to claim 2, wherein the solvent is a polar organic solvent.

4. The epoxy resin composition according to claim 1, wherein the inorganic filler has a proportion of finely divided fillers of at least 5 wt. % based on the total weight of the inorganics filler.

5. The epoxy resin composition according to claim 1, additionally containing at least one curing agent and/or at least one reactive diluent.

6. The epoxy resin composition according to claim 5, wherein
the epoxy resin comprises at least one glycidyl ether, and/or
the curing agent contains at least one polyamine, which is selected from the group consisting of aliphatic, cycloaliphatic or arylaliphatic primary diamines, triamines, tetramines, polyamines with more than four amine groups per molecule, secondary amine group-containing polyamines, amine/polyepoxide adducts, poly(ethylene imines), polyamidoamines, Mannich bases and amino-terminated butadiene/acrylonitrile copolymers, and/or
the inorganic filler has at least one filler selected from silicon compounds of at least one of silica, silicates and precipitated and pyrogenic silicas, metal oxides of at least one of titanium dioxide, iron oxide, alumina, zinc oxide and magnesium oxide; metal carbonates of at least one calcium carbonate and dolomite; metal sulfates of at least one of calcium sulfate and barium sulfate; metal hydroxides of at least one of aluminum hydroxide, nitrides and carbides, clay minerals of at least one of kaolin, fly ash, cement, glass and ceramic materials.

7. A multi-component system for producing a curable epoxy resin composition according to claim 1, comprising at least
one component K1 containing said at least one epoxy resin, and
optionally a curing agent component K2 containing said at least one curing agent,
wherein at least one curing agent is contained in said component K1 or K2,
wherein said at least one inorganic filler coated with the polycarboxylate ether is contained in said component K1, K2, and/or a further component K3.

8. The multi-component system according to claim 7, comprising at least
one component K1 containing at least one epoxy resin,
one component K2 containing at least one curing agent, and
one solid component K3 containing
(a) 93 to 99.7 wt. % inorganic fillers,
(b) 0.01 to 2 wt. % polycarboxylate ether, and
(c) 0.02 to 5 wt. % solvent.

9. A cured epoxy resin obtainable by mixing the components and curing a multi-component system according to claim 7.

10. A method comprising applying the multi-component system according to claim 7 to a substrate to bond, coat or seal the substrate, or to a mold to produce a molding therein.

11. A cured epoxy resin obtainable by curing an epoxy resin composition according to claim 1.

12. A curable epoxy resin composition containing at least one epoxy resin having on average more than one epoxide group per molecule, at least one inorganic filler and at least one polycarboxylate ether, wherein the inorganic filler is coated with the polycarboxylate ether, wherein the polycarboxylate ether comprises:

a) at least one acid moiety A of formula (I):

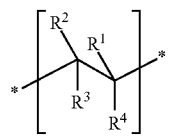

wherein in formula (I):
each $R^1$, $R^2$ and $R^3$ independently of one another represents H, —COOM, —CH$_2$COOM or an alkyl group having 1 to 5 carbon atoms,
each $R^4$ independently of one another represents —COOM, —CH$_2$COOM, —SO$_2$—OM, —O—PO(OM)$_2$ and/or —PO(OM)$_2$,
or wherein $R^3$ together with $R^4$ forms a CO—O—CO-ring;
wherein M represents H, an alkali metal, an alkaline earth metal, ammonium, an ammonium cation, an organic ammonium compound, or mixtures thereof;
with the proviso that overall one or two of $R^1$, $R^2$, $R^3$ and $R^4$ is/are acid groups;

b) at least one structural moiety B of formula (II);

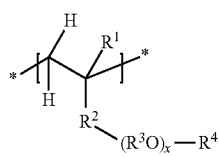

wherein in formula (II):
$R^1$ independently of one another represents H or CH$_3$;
$R^2$ independently of one another represents an ester group —CO—O— or an amide group —CO—NH—;
$R^3$ independently of one another represents a C$_2$-C$_6$ alkylene group,
$R^4$ independently of one another represents H, a C$_1$-C$_{12}$ alkyl or cycloalkyl radical, a C$_7$-C$_{20}$ alkylaryl or aralkyl radical, or a substituted or unsubstituted aryl radical, or a monovalent organic radical having 1 to 30 carbon atoms, which optionally comprises heteroatoms, and
x independently of one another represents a value between 3 and 250,
wherein the main chain of the polycarboxylate ether is a linear copolymer which was obtained by polymerization using said at least one acid moiety or a salt or anhydride thereof,
wherein said structural moiety B is a component of this linear copolymer.

13. The epoxy resin composition according to claim 12, wherein the polycarboxylate ether has at least one further structural moiety C, which is different from the structural moieties A and B, and which is selected from an ether, ester, amide or imide moiety, an acid moiety selected from carboxylic acid, sulfonic acid, phosphonic acid, phosphoric acid ester, carbonylamidomethylpropanesulfonic acid and salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl or N-pyrrolidonyl group.

14. A method comprising dispersing an an inorganic filler in a curable epoxy resin composition with a polycarboxylate ether as a dispersing agent, wherein
the polycarboxylate ether has side chains linked to a main chain via ester, amide and/or ether groups wherein the main chain has at least one acrylic acid moiety or a salt thereof, and/or at least one methacrylic acid moiety or a salt thereof, and/or a maleic anhydride moiety or a salt thereof, and/or a maleic acid moiety or a salt thereof, and/or an itaconic acid moiety or a salt thereof, and/or a crotonic acid moiety or a salt thereof, and/or a fumaric acid moiety or a salt thereof.

15. A solid filler which is coated with a polycarboxylate ether, containing
(a) 93 to 99.97 wt. % inorganic fillers,
(b) 0.01 to 2 wt. % polycarboxylate, and
(c) 0.02 to 5 wt. % organic solvent, wherein
the polycarboxylate ether has side chains linked to a main chain via ester, amide and/or ether groups, wherein the main chain has at least one acrylic acid moiety or a salt thereof, and/or at least one methacrylic acid moiety or a salt thereof, and/or a maleic anhydride moiety or a salt thereof, and/or a maleic acid moiety or a salt thereof, and/or an itaconic acid moiety or a salt thereof and/or a crotonic acid moiety or a salt thereof, and/or a fumaric acid moiety or a salt thereof.

* * * * *